United States Patent [19]

Marumoto et al.

[11] 4,096,418
[45] Jun. 20, 1978

[54] AUTOMATIC CHANGE-GEAR CONTROL DEVICE FOR USE IN ELECTROMOBILE

[75] Inventors: Katsuji Marumoto; Tsutomu Omae; Toshio Suzuki; Takanori Shibata, all of Hitachi; Hirohisa Yamamura, Naka, all of Japan

[73] Assignee: The Agency of Industrial Science and Technology, Tokyo, Japan

[21] Appl. No.: 782,937

[22] Filed: Mar. 30, 1977

[30] Foreign Application Priority Data

Jun. 18, 1976 Japan .................................. 51-71229

[51] Int. Cl.² ........................................... H02P 5/06
[52] U.S. Cl. ...................................... 318/12; 318/139; 318/395; 180/65 R
[58] Field of Search ................. 318/139, 12, 395, 396, 318/397, 398; 180/65 R; 192/0.02 R

[56] References Cited

U.S. PATENT DOCUMENTS

| | | | |
|---|---|---|---|
| 3,984,742 | 10/1976 | Bader | 318/139 X |
| 4,021,712 | 5/1977 | Ishihara et al. | 318/139 X |

*Primary Examiner*—B. Dobeck
*Attorney, Agent, or Firm*—Beall & Jeffery

[57] ABSTRACT

An electromobile equipped with an automatic transmission which may detect a running condition of a vehicle and selects a gear ratio suited for the running condition. In this electromobile, a build-up characteristic of an electric motor current immediately after gear-change is improved, thereby minimizing delay in power transmission so as to shorten a gear-changing duration, in an attempt to improve an operational feeling of a driver at the time of gear change.

1 Claim, 5 Drawing Figures

AUTOMATIC CHANGE-GEAR CONTROL DEVICE FOR USE IN ELECTROMOBILE

BACKGROUND OF THE INVENTION

This invention relates to an automatic change-gear control device for use in an electromobile.

It has been a common practice in an automatic changegear control device for use in a prior art electromobile to commonly use a single control circuit both for forward running and for regenerative braking for the purposes of speed-matching control at the time of gear change, and simplifying a circuit arrangement.

In the control circuit for forward running and regenerative braking, there has been adopted a compensating circuit consisting essentially of a delay circuit for preventing an electric motor and drive circuit from being damaged due to a large amount of current flowing therethrough, upon starting of a vehicle. For this reason, a build-up characteristic of a motor current is impaired, immediately after gear change for acceleration, so that an increase in torque of an electric motor is delayed, thus failing to provide desired acceleration and hence an unsatisfactory operational feeling.

SUMMARY OF THE INVENTION

It is an object of the present invention to simplify the circuit arrangement by conducting a speed matching control at the time of gear change by the use of a control circuit provided for generative braking, and to accelerate build-up of a motor current after gear change, with the accompanying acceleration of generation of a motor torque, thereby improving an operational feeling, when driving an electromobile.

According to the present invention, when gears are shifted back to a forward running mode or a regenerative braking mode, after the completion of a speed matching control, a compensating signal is temporarily added to a control signal, thereby accelerating the build-up of a motor current.

DESCRIPTION OF THE PREFERRED EMBODIMENTS

Figure 1:
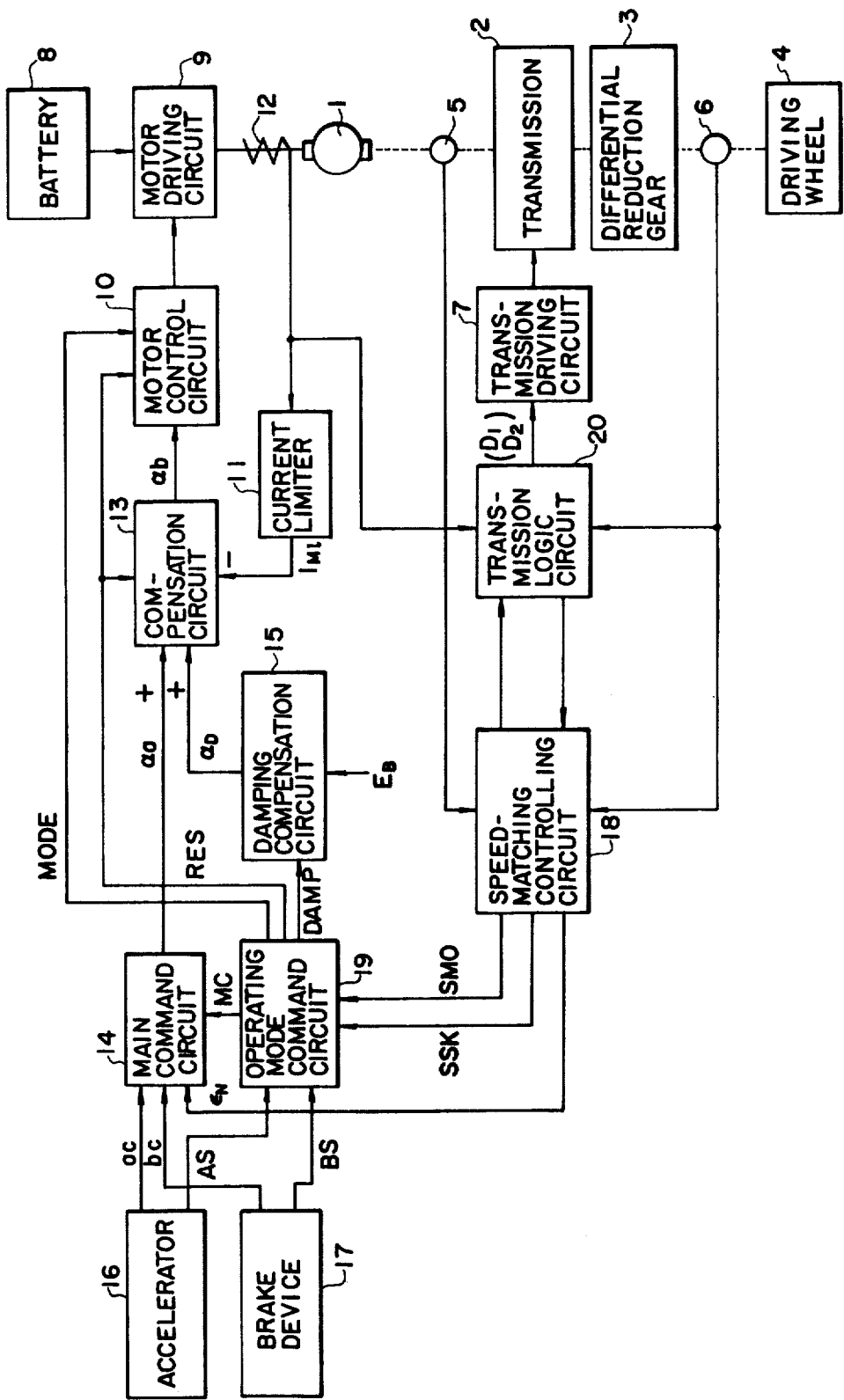
FIG. 1 is a block diagram showing one embodiment of an automatic change-gear control device for use in an electromobile according to the present invention.

One embodiment of the present invention will be described in more detail with reference to a block diagram of FIG. 1.

Shown at 1 is an electric motor adapted to drive an electromobile. For simplicity of description, the electric motor 1 is provided in the form of a d.c. electric motor having a constant field system and adapted to produce a torque proportional to an armature current. Shown at 2 is a transmission consisting of electromagnetic clutches 201 to 203, and change gears 204 to 209, at 3 a differential reduction gear, at 4 a driving wheel, at 5 a r.p.m. detector for detecting the speed of an electromobile, at 7 a transmission driving circuit for driving an electromagnetic solenoid or hydraulic electromagnetic valve built in the transmission 2, at 8 a d.c. power source, for instance, a battery, at 9 a motor driving circuit for driving the d.c. electric motor 1, at 10 a motor control circuit for controlling the operating condition of the motor driving circuit 9 as well as for changing-gear an operational mode from one to another, of the motor driving circuit 9 according to a forward running signal or a regenerative braking signal, at 11 a current control circuit for controlling a maximum armature current according to an output of an armature current detector 12 for use in an electric motor 1, at 13 a compensating circuit for providing a control signal for the motor control circuit 10 by receiving an output of a current control circuit 11, an output of a command circuit 14, and an output of a damping compensating circuit 15, at 14 a command circuit adapted to select among an analogue output signal $ac$ from an accelerator 16, an analogue output signal $bc$ from a brake device, an analogue signal $eN$ from a speed matching control circuit 18, as a command signal for the compensating circuit 13, by receiving a signal MC from an operating mode command circuit 19, at 19 an operating mode command circuit adapted to generate signals such as a signal RES for resetting a capacitor in the compensating circuit 13, a signal MODE designating an operating mode of the motor control circuit 10, a starting signal DAMP for causing the damping compensating circuit 15 to generate an output signal, and the like, according to a digital signal AS representing the generation of an output at the accelerator 16, a digital signal BS representing the generation of an output at the brake device 17, a signal SSK representing the matching of speeds and to be fed from the speed matching control circuit 18, and a signal SMO representing an operating mode of regenerative braking. Shown at 20 is a transmission logic circuit adapted to decide a timing to change gears according to an armature current and a vehicle speed.

The operation shown in FIG. 1, when an accelerator pedal is pushed down to a given extent for acceleration, will be described with reference to the operating wave forms shown in FIG. 2. Upon acceleration by the first speed gears 204, 207, an output $\alpha a$ of the command circuit 14 assumes a value commensurate with an output of the accelerator 16, while a MODE signal from the operational mode command circuit 19 represents a forward running mode, the motor control circuit 10 and motor drive circuit 9 effect forward running operations, and the d.c. electric motor 1 is accelerated and hence a vehicle speed is increased. A signal is generated in the transmission logic circuit 20 for shifing gears to the second speed mode at a vehicle speed of v1, when the r.p.m. (N) of the d.c. motor 1 reaches its maximum allowable r.p.m. (Nmax). This signal brings a D1 signal representing engagement of the first speed gears 204, 207, to a zero level, so that the first speed gear 207 in the transmission 2 is disengaged from a driven shaft 3a into a neutral condition, due to disengagement of the electromagnetic clutch 201. As a result, power can no longer be transmitted from an output shaft 1a of the d.c. electric motor 1. At the same time, a resetting signal RES is generated in the operating mode command circuit 19 so as to be fed to the compensating circuit 13 and motor control circuit 10, thereby disconnecting the motor driving circuit 9. It follows from this that a motor current $I_M$ flowing into the d.c. electric motor 1 is nullified, as shown in FIG. 2. On the other hand, a deviation signal εN commensurate with a gear ratio is generated in the speed matching control circuit 18 by receiving outputs of the r.p.m. detector 5 and vehicle speed detector 6. In other words, assume a gear ratio $\eta_1$ of the first speed mode, and a gear ratio $\eta_2$ of the second speed mode, then it is mandatory that the r.p.m. of electric motor $N2 = \eta_2 \cdot v_1$, for bringing the second speed gears into engagement smoothly. Meanwhile, the r.p.m. Nmax $= \eta_1 \cdot v_1$, when the first speed gears 204, 207 are disengaged, so that a difference in r.p.m. of the both gears, εN = N2 − Nmax. Thus, the engagement of the second gears 205, 208 should be made, after the deviation signal εN has been nullified. A control to nullify the deviation signal εN is referred to as a speed matching control.

For this reason, a deviation signal εN is generated in the speed matching control circuit 18, simultaneously with the commencement of gear-change, and then fed to the command circuit 14. A digital signal SSK representing that the speed change is in process, and a signal SMO representing an operating mode of forward running or regenerative braking are fed to the operating mode command circuit 19. In case the first speed gears 204,207 are shifted to the second gears 205,208, εN<0, so that the signal SMO represents an operating mode of regenerative braking. During gear change, the MODE signal from the operating mode command circuit 19 represents a regenerative braking mode, while interrupting the resetting signal RES for the compensating circuit 13 and motor control circuit 10. As a result, the regenerative braking is effected, and the motor r.p.m. N is reduced to N2. During the above control, gears remain in the neutral position, and thus the vehicle speed v1 remains unchanged. The resetting signal RES is generated again at the time t3, when the deviation signal εN is nullified, and the supply of power to the d.c. motor 1 is interrupted, whereupon the electromagnetic clutch 202 is engaged and a signal D2 for bringing the second gears 205, 208 into engagement is fed to the transmission drive circuit 7. At the time t4 i.e., a given time after the generation of the signal D2, when the second speed gears 205, 208 have been completely engaged, a current is again fed to the d.c. motor 1 commensurate with an output of the accelerator 16, thereby increasing the r.p.m. (N) of the d.c. electric motor 1. At this time, gears have been engaged in the second speed position, so that the speed of a vehicle is increased.

Meanwhile, with the control device for use in an electromobile, an extremely large amount of current flows into the d.c. motor 1, when a high voltage is impressed on the d.c. motor stepwise, with the d.c. motor 1 remaining in its stopped condition, such as in the case of starting a vehicle. This causes an damage in the motor driving circuit 9 and d.c. motor 1. For preventing this, an accelerator pedal is pushed down to its full extent at the starting of operation. However, to avoid a sharp change in voltage being impressed on the d.c. motor 1, there is provided a delay circuit having a relatively large time constant, in the compensating circuit 13.

According to the prior art automatic change-gear control device, because of the provision of a delay circuit, even if an output ac of the accelerator 16 at the gear-change completion time t4 is impressed stepwise, an output $\alpha_b$ of the compensating circuit 13 is gradually increased as shown by a broken line in FIG. 2. As a result, a voltage being impressed on the d.c. motor 1 is only gradually increased. On the other hand, immediately after gear change, the d.c. motor 1 rotates at a r.p.m. N2 at the time t4, as shown in FIG. 2. As a result, a voltage difference between an impressed voltage and an induced voltage is only impressed, so that a current $I_M$ flowing into the d.c. motor 1 is only gradually increased, as shown by a broken line in FIG. 2. For this reason, a motor torque remains small immediately after gear change, with the result that a driver feels like acceleration is interrupted temporarily. Even if a gear-changing duration from the time t1 to the time t4 is short, as far as a motor torque remains small, there may not be obtained an acceleration feeling, so that a driver feels like a gear-changing duration is excessively long.

Figure 2:
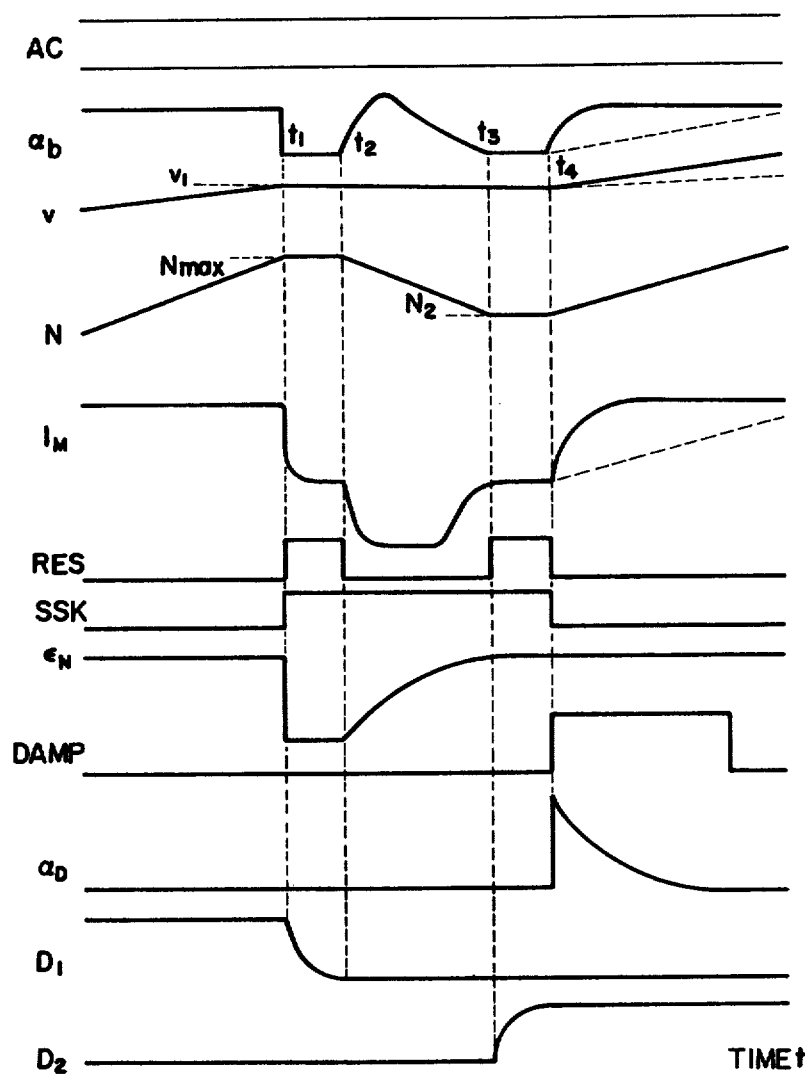
FIG. 2 is an operating wave form diagram of respective portions at the time of change gear for illustrating the operation of the automatic gear control device.
Figure 3:
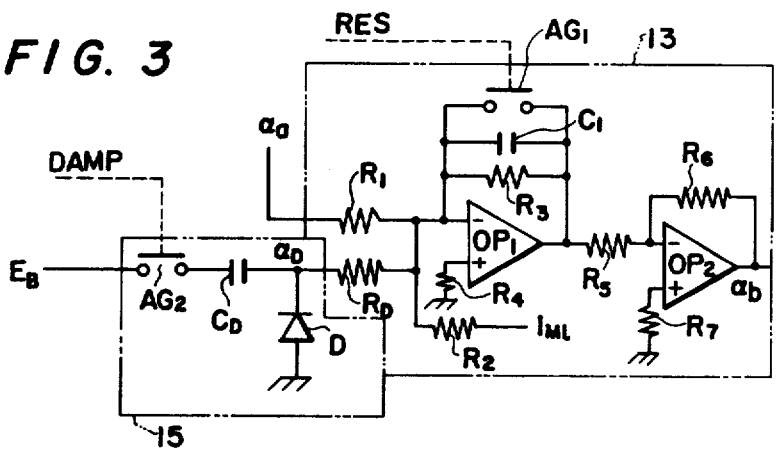
FIG. 3 is a circuit diagram of a compensating circuit of FIG. 1.

To cope with this, according to the embodiment of the present invention as shown in FIG. 1, a signal DAMP shown in FIG. 2 is generated in the operating mode command circuit 19 at the time when the gear-changing is terminated, thereby feeding a given voltage $E_B$ by way of the damping compensating circuit 15 to the compensating circuit 13. The damping compensating circuit 15 and compensating circuit 13 are of such arrangements as shown in FIG. 3. Referring to FIG. 3, when a signal DAMP is fed, then an analogue gate AG2 is closed, and the voltage $E_B$ of a given level is impressed on a capacitor $C_D$. As a result, a pulse as shown at α D in FIG. 2 is generated from a junction of the capacitor $C_D$ to a diode D. The pulse α D is applied by way of an input resistor $R_D$ to an operational amplifier OP1 in the compensating circuit. On the other hand, an output $\alpha_a$ of the command circuit 14 is fed by way of an input resistor R1 to the operational amplifier OP1. In addition, an output $I_{Ml}$ of the current limiting circuit 11 as well is fed by way of an inpup resistor R2 thereto. However, the output $I_{Ml}$ is not produced only in the case of a current exceeding a maximum allowable level, so that the output $I_{Ml}$ may be regarded as zero, immediately after gear-change. Thus, the operational amplifier OP1 adds $\alpha_a \times R_2/R_1$ to $\alpha_D \times R_2/R_D$ and smoothens an output of the amplifier OP1 according to a time constant dependent on the product of a feedback resistance R3 and a feedback capacitance C1. A signal $\alpha_b$ may be obtained through a code converting circuit composed of an input resistor R5, feedback resistor R6 and operational amplifier OP2, as shown by a solid line wave form in FIG. 2. In FIG. 3, the diode D only receives a negative side pulse of differentiating pulses from the capacitor $C_D$, while an analogue gate AG1 shortcircuits the feedback capacitor C1, only when the resetting signal RES is generated, thereby nuliffying an output of the operational amplifier OP1.

According to the operation of the damping compensating circuit 15, an output of the compensating circuit 13 assumes a relatively large value immediately after gear change, as shown by a solid line $\alpha_b$ in FIG. 2, while the motor current $I_M$ shows a sharp build-up as shown by a solid line in FIG. 2. This eliminates the feeling like an interrupted acceleration due to delayed build-up of a current as experienced in the past, thereby providing an improved operational feeling. This is particularly effective at the time of gear-change such as in the cases of acceleration and running on an upward slope, wherein a vehicle runs, consuming a large amount of a motor current.

Figure 4:
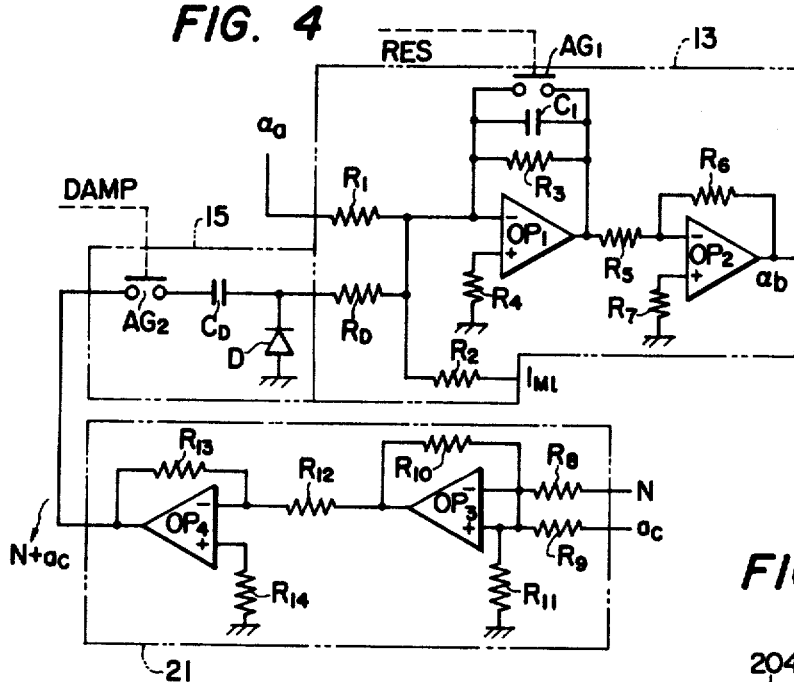
FIG. 4 is a circuit diagram of a compensating circuit in another embodiment of the present invention.
Figure 5:
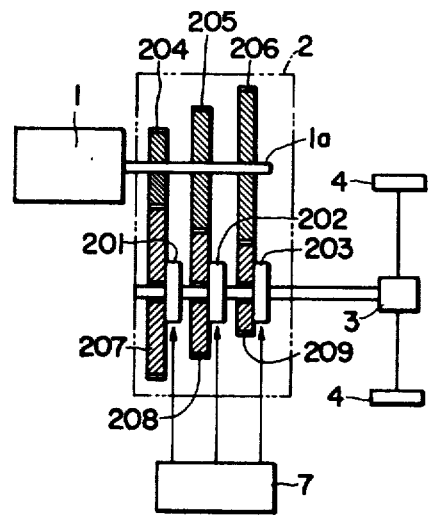
FIG. 5 is a detailed view of a transmission of FIG. 1.

FIG. 4 shows another embodiment of the compensating circuit according to the present invention. This embodiment uses a damping-level operation circuit 21, in place of a voltage $E_B$ of a given level which is an input signal for the damping compensating circuit 15 shown in FIG. 3. An output $a_b$ of the compensating circuit 13 is substantially proportional to a voltage being impressed on the d.c. motor 1, so that even if the output $a_b$ remains the same, an inducing voltage in the d.c. motor 1 varies a value of a motor current. In other words, when the r.p.m. of the d.c. motor 1 is high, a motor current becomes less, and when the r.p.m. of the motor 1 is low, a motor current is increased. Accordingly, when the damping compensation is made at a given voltage $E_B$, then there results varying compensating effects depending on the r.p.m. of the motor at the time of gear-change. The embodiment shown in FIG. 4 copes with this. More particularly, in the embodiment shown in FIG. 4, the damping compensation is made according to an motor r.p.m. plus an accelerator output $ac$, in place of a given voltage $E_B$ of FIG. 3, and hence there is provided an adding circuit composed of operational amplifiers OP3, OP4, resistors R8, R9, R10, R11, R12, R13, thereby feeding an input to the damping compensating circuit 15. With the aforesaid arrangement, when the motor r.p.m. (N) is high and an accelerator pedal is pushed down to a large extent, then there results an enhanced compensating effect, thereby permitting a rapid build-up of a motor current at every operating point. Meanwhile, the use of accelerator output $ac$ for the aforesaid damping compensation is adapted from the consideration of the will of a driver. A compensating effect is required for accelerating build-up of a motor current, because when an accelerator output $ac$ is large, then a rapid increase in an output torque is desired.

According to the embodiment of FIG. 4, a consistent compensating effect may be achieved at every gear-change point, with the accompanying reduction in gear-changing duration and improvement in an operational feeling.

As is apparent from the foregoing description of the automatic change-gear control device according to the present invention, a motor current immediately after gear-change may be built up rapidly, thus eliminating a feeling like an interrupted acceleration after gear-change, by shortening a gear-changing duration actually.

As a result, an operational feeling may be improved markedly, at the time of gear change.

What is claimed is:

1. An automatic change-gear control device for use in an electromobile, comprising:
    a driving electric motor;
    a motor driving circuit connected between said driving electric motor and a d.c. power source or battery;
    a transmission disposed between said driving motor and a driving wheel, and including a clutch and change gears;
    a main command circuit for controlling a motor current according to command signals from an accelerator and brake means;
    a motor control circuit for feeding a control signal to said motor driving circuit by receiving an output of said main command circuit;
    means for detecting a motor current;
    a transmission logic circuit for generating a signal adapted to change over and control said clutch and gears in said transmission according to a predetermined given pattern by using as an input a detected motor current and a vehicle speed, said logic circuit driving said clutch so as to bring said gears in engagement with said motor, after said gears have been selected, upon completion of speed matching;
    speed matching control means for adjusting the r.p.m. of a motor commensurate with a gear ratio after gear-change, with said clutch maintained in a disengaged condition, at the time of gear change;
    a deviation-signal compensating circuit disposed between said motor control circuit and said main command circuit for stabilizing a control system; and
    a damping compensating circuit for detecting the time when the speed matching is completed, and generating a compensating signal for increasing a motor current for a given time duration after the completion of the speed matching;
    whereby the build-up duration of a motor current immediately after gear change may be accelerated so as to shorten a gear changing time.

* * * * *